United States Patent

Ito et al.

[15] 3,662,473

[45] May 16, 1972

[54] METHOD OF AND A DEVICE FOR POSITIONING A CUTTING TOOL ON A TOOL REST OF A MACHINE TOOL

[72] Inventors: Kazuo Ito; Hiroyuki Yotsubayashi, both of Kawasaki, Japan

[73] Assignee: Ikegai Tekko Kabushiki Kaisha, Tokyo, Japan

[22] Filed: Dec. 4, 1969

[21] Appl. No.: 882,193

[52] U.S. Cl. ............................................. 33/185, 33/201 R
[51] Int. Cl. ...................................... B27g 23/00, G01b 5/20
[58] Field of Search ............... 33/185, 201, 202, 143 J, 143 K

[56] References Cited

UNITED STATES PATENTS

| 2,700,827 | 2/1955 | Rowe | 33/185 |
| 809,562 | 1/1906 | Gumpp | 33/201 |
| 3,060,584 | 10/1962 | Westfall | 33/143 K |
| 1,404,989 | 1/1922 | Marcy | 33/185 X |

*Primary Examiner*—Leonard Forman
*Assistant Examiner*—Paul G. Foldes
*Attorney*—Wenderoth, Lind & Ponack

[57] ABSTRACT

A gauge plate carrier having a number of slots on one of its end surfaces is detachably secured to a tool holder at a predetermined position. A gauge plate having a gauge surface suitably shaped so as to conform to the tip of a cutting tool to be set is put on the tip of the cutting tool previously and precisely set on the tool holder so that a portion thereof lies in the slot of the gauge plate carrier and is rigidly secured to the carrier. When the setting of a cutting tool on the tool holder is required, it is carried out on the basis of the gauge plate which is firmly held on the tool holder by securing the gauge plate carrier to it.

2 Claims, 14 Drawing Figures

PATENTED MAY 16 1972

INVENTORS
KAZUO ITO
HIROYUKI YOTSUBAYASHI

BY *Wenderoth, Lind & Ponack*
ATTORNEYS

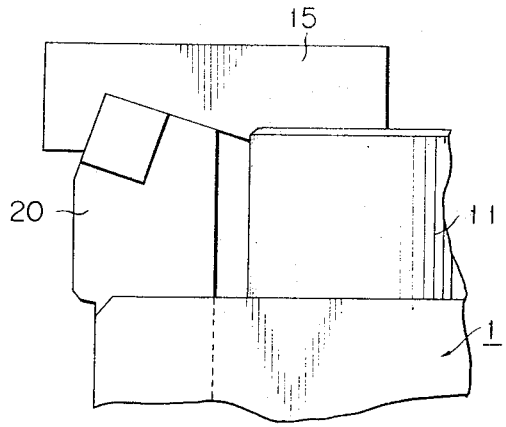
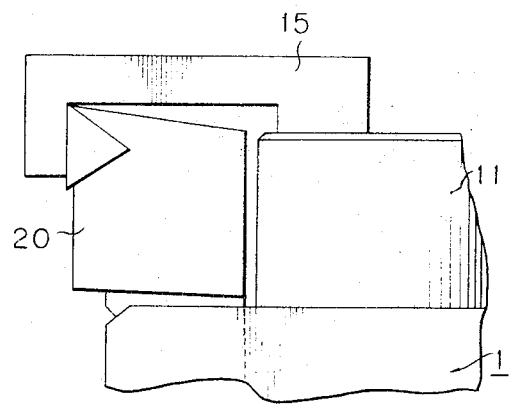
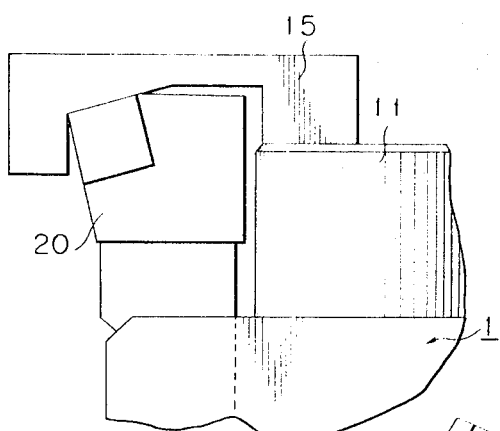
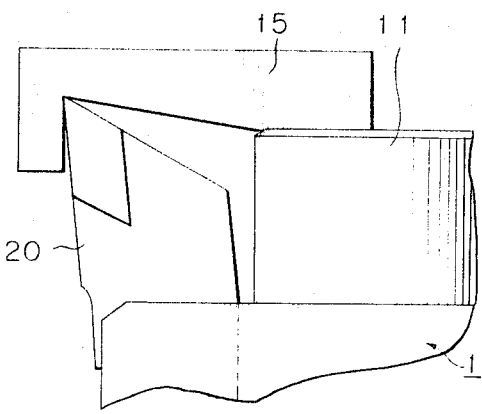
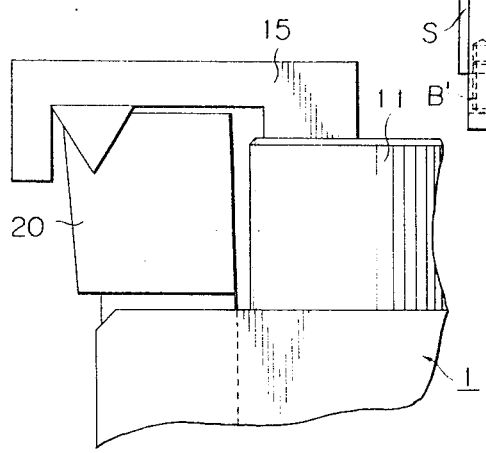
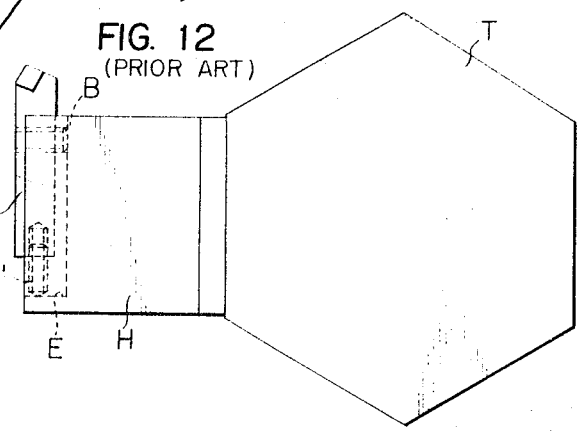

| MEASURING NO. | ⊕↕ +/− | ⊕ ←+ −→ ▱ | ⊕ ▽ +↕− | ⊕ ▽ +← −→ | ⊕ A B+− | |
|---|---|---|---|---|---|---|
| | | | | | A | B |
| 1 | 0 μ | 0 μ | −5 μ | +1 μ | −1 μ | 0 μ |
| 2 | +3 | +3 | −4 | +1 | +1 | +4 |
| 3 | +2 | +2 | 0 | +4 | 0 | +2 |
| 4 | +2 | +4 | 0 | +4 | +1 | +2 |
| 5 | +2 | +2 | −4 | +4 | +1 | +2 |
| 6 | +1 | −1 | −1 | +6 | 0 | |
| 7 | +2 | −1 | 0 | +4 | +1 | |
| 8 | +1 | 0 | 0 | +6 | +4 | |
| 9 | 0 | −2 | −1 | +7 | +2 | |
| 10 | +1 | +2 | −2 | +5 | +4 | |

NOTE; "A" AND "B" DENOTE TOLERANCE ERRORS IN RADIAL AND LONGITUDINAL DIRECTIONS RESPECTIVELY.

INVENTORS
KAZUO ITO
HIROYUKI YOTSUBAYASHI
BY *Wenderoth, Lind & Ponack*
ATTORNEYS

METHOD OF AND A DEVICE FOR POSITIONING A CUTTING TOOL ON A TOOL REST OF A MACHINE TOOL

BACKGROUND OF THE INVENTION

When positioning and setting a cutting tool on a tool holder of a tool rest of a machine tool such as a turret of an automatic lathe, it is conventional that the shank of the cutting tool is previously provided with two adjusting bolts attached thereto to adjust its position in X- and Y- directions, respectively, and after the tool has been adjusted on a separately prepared setting gauge, which is used exclusively for the cutting tool, and provided with two fundamental surfaces being orthogonal to each other, by adjusting the adjusting bolts so that its position precisely corresponds to the desired one in respect to the fundamental surfaces of the setting gauge, it is set on the tool holder in its tool receiving slot which is provided with two fundamental surfaces corresponding to those of the setting gauge so that they make a right angle to each other.

However, according to this conventional method for positioning and setting a cutting tool on a machine tool holder of the associated tool rest, the accuracy of tool setting thereon is not satisfactory because there inevitably occurs an artificial error in transferring the cutting tool from the setting gauge to the tool holder even though the positioning of a cutting tool on the setting gauge is believed to have been precisely done and the tool receiving slot of the tool holder has been precisely processed. Also, such conventional method is quite time consumming. Further, all of the shanks of the various cutting tools adaptable to be set on the tool rest must be fitted with the X- and Y- adjusting bolts.

SUMMARY OF THE INVENTION

This invention relates to a method of and a device for positioning a cutting tool on a machine tool holder of an associated tool rest, and more particularly to a method of and a device for positioning a cutting tool on a turret of an automatic lathe such as a numerically controlled lathe.

It is an object of the present invention to provide a method of and a device for positioning such a cutting tool in the aforesaid manner which can expeditiously and precisely determine the position of the tool to be set on the tool holder in a much lesser time than required by the prior art conventional methods.

It is another object of the present invention to provide a method of and a device for positioning a cutting tool of the stated character and in the aforesaid manner as related to tool holders of automatic machine tools such as on the turrets of numerically controlled lathes.

A further object of the present invention is to provide such a method of and a device of the stated character for positioning a cutting tool which obviates the prior art necessity of processing the shank of the cutting tool with threaded holes into which the X- and Y- adjusting bolts are screwed.

According to the present invention, the novel method of positioning a cutting tool on a tool holder of a tool rest of a machine tool comprises the steps of: (a) precisely setting the cutting tool on the tool holder; (b) precisely fixing a detachable gauge plate carrier on the tool holder; (c) precisely putting a gauge plate having a suitable gauge surface conforming to the shape of the tip of a pattern cutting tool which has been previously and precisely set on the tool holder, and rigidly fixing the gauge plate to the gauge plate carrier.

According to the present invention, the novelly improved device for positioning such a cutting tool on a machine tool of an associated tool rest comprises one or more gauge plates each having a predetermined gauge surface conforming to the shape of a cutting tool to be set, and a gauge plate carrier adapted to be detachably mounted on the tool holder of the machine tool rest and to receive the gauge plate on its surface, whereby each of the gauge plates is rigidly secured to the gauge plate carrier after it is precisely positioned relative to the respective cutting tools which have been previously and precisely set as patterns on the tool holder.

BRIEF DESCRIPTION OF THE DRAWINGS

The above and other objects, features and advantages of the invention will be more readily understood from the following detailed description taken in conjunction with the accompanying illustrative drawings, in which:

FIGS. 7 to 11 are plan views of various gauge plates for the cutting tools in various shapes;

FIG. 12 is a plan view of a conventional prior art tool holder;

Figures 13, 14:
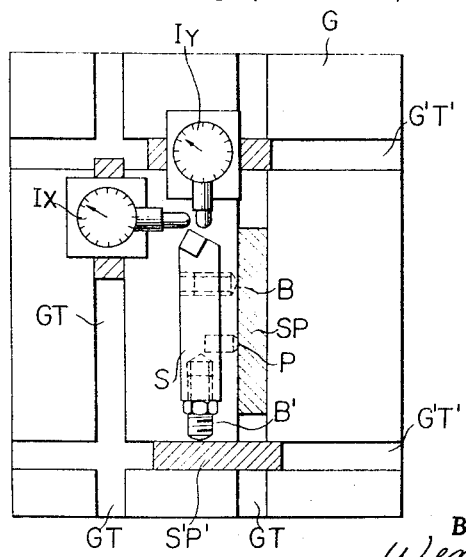
FIG. 13 is a plan view of a conventional prior art tool setting gauge.
FIG. 14 shows a chart or table of the numerical examples of the positioning tolerances or errors of the cutting tools when they are mounted on the tool holder by using the device according to the present invention.

A typical conventional prior art method of positioning and setting a cutting tool as related to the turret of an automatic lathe is shown in FIGS. 12 and 13. As shown there, the shank S of a cutting tool to be mounted on the tool holder H of the turret T of a machine tool is previously processed so that it secures adjusting bolts B and B' at one of its side surfaces and its end face, respectively, for positioning the cutting tool in X- and Y- directions, respectively, and further utilizes a guide pin P on the side surface to which the bolt B is secured. In addition to the cutting tool, a specially designed setting gauge G is prepared for precisely adjusting the adjusting bolts B and B' so that the cutting tool is precisely set in the tool holder H. The gauge G is provided with two pairs of grooves GT and G'T' on one of its surfaces to receive stop plates SP and S'P' and indicators $I_x$ and $I_y$. In adjusting the adjusting bolts B and B' of the cutting tool S with the gauge G, first the tool shank S is placed on the setting gauge G so that its bolts B and B' come into contact with the stop plates SP and S'P' which, respectively, fit within the right-angularly disposed grooves GT and G'T' of the gauge G (see FIG. 13). Then the positioning of the cutting tool in X- and Y- directions is carried out by adjustment of the adjusting bolts B and B' respectively, so that the indicators $I_x$ and $I_y$, as respectively slidably mounted within the grooves GT and G'T' of the setting gauge G, indicate predetermined values respectively when they are moved along the grooves GT and G'T' relative to the tip of the cutting tool. Thus, upon completion of the adjustment of the tool-attached adjusting bolts B and B', the cutting tool is transferred to the tool holder H of the turret T which has previously been processed with fundamental surfaces E and F at its tool setting slot so that they precisely correspond to the same relative positions of the stop plates SP and S'P' on the setting gauge G as shown in FIG. 12. Thereafter, the cutting tool is rigidly secured to the tool holder H in its slot.

Accordingly to the aforedescribed prior art positioning and setting method of such a cutting tool on a tool holder, it has been found that, even though the adjustment of the adjusting bolts B and B' of the cutting tool has been precisely done with such an exclusive setting gauge as shown in FIG. 13, it is very difficult to limit the positioning error or tolerance of the cutting tool on the tool holder H to within $20\mu$, even though the slot of the tool holder has been very precisely prepared.

Further, it usually takes a very long time to set the tool, and it necessitates processing all of the various tool shanks to receive adjusting bolts and guide pins.

DESCRIPTION OF THE PREFERRED EMBODIMENTS

Figure 1:
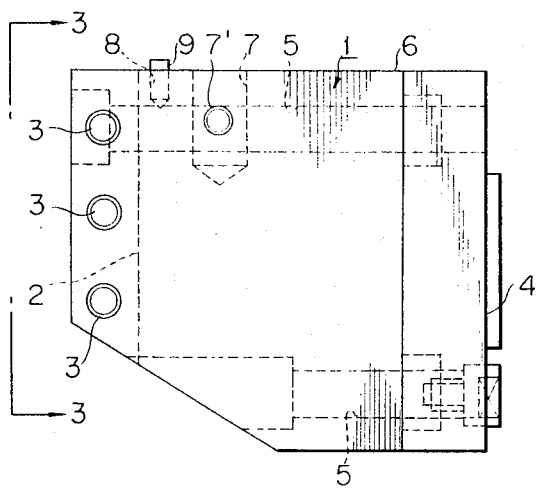
FIG. 1 is a plan view of an illustrative, improved holder cooperating with a device for positioning a machine cutting tool on a tool holder of a related tool rest, embodying the present invention.
Figure 2:
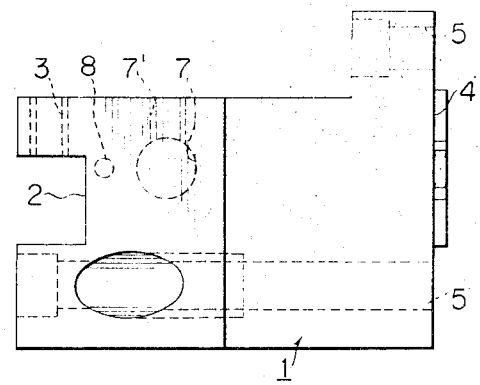
FIG. 2 is an elevational view of the tool holder of FIG. 1.
Figure 3:
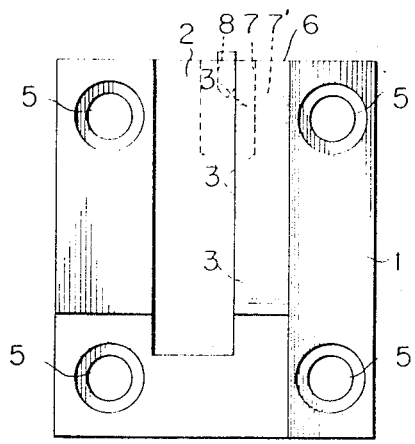
FIG. 3 is an elevational side view of the tool holder as viewed substantially on line 3—3 of FIG. 1.
Figure 4:
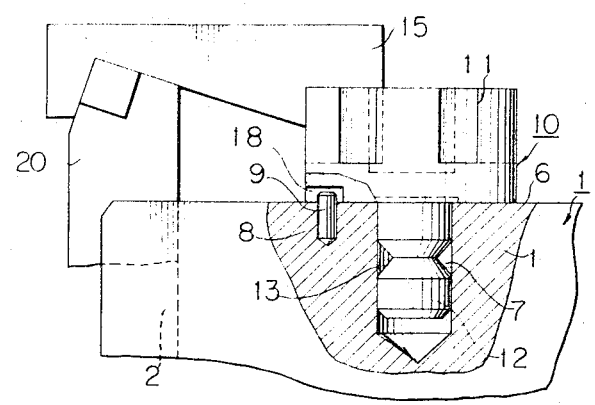
FIG. 4 is a plan view partially in cross-section of the tool holder of FIG. 1, showing the manner in which the novel device for positioning a cutting tool on a machine tool holder of a related tool rest embodying the present invention is mounted thereon.
Figure 5:
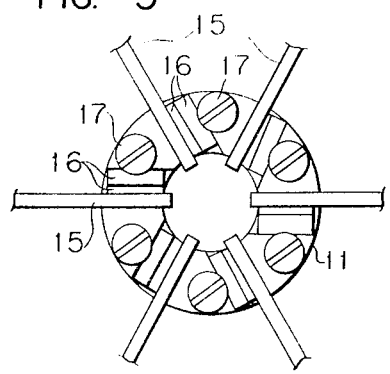
FIG. 5 is an elevational view of the device of FIG. 4 with the gauge plates broken off at their outer ends.
Figure 6:
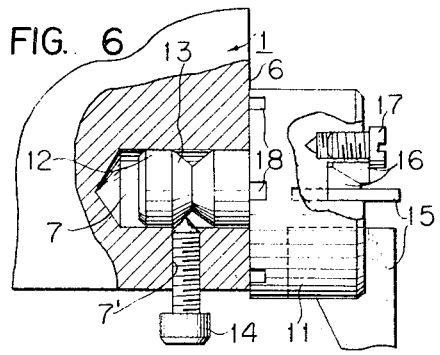
FIG. 6 is a side elevational view partially in cross-section of FIG. 4.

Referring to FIGS. 1 and 3 of the drawings which show an example of a tool holder cooperating with a device for positioning a cutting tool on a tool holder of a tool rest for a machine tool according to the present invention, the tool holder 1 is provided at its forward end surface with a slot 2 for receiving the shank of a cutting tool 20 (see FIG. 4), which tool via its shank is rigidly fixed to the tool holder 1 by set screws (not shown) screwed into threaded holes 3 suitably provided as by boring and tapping in one of the side walls defining the slot 2, as in conventional tool holders. The tool holder 1 is adapted to be attached to the tool rest, such as a turret of an automatic lathe, at its end surface 4 opposite to the surface provided with the slot 2, as by bolts passing through holes 5 which are bored through the body of the tool holder 1. On one of the side surfaces of the tool holder 1, perpendicular to the longitudinal axis of the slot 2, that is, on the side surface 6, there is formed a hole 7 for receiving a central shaft 12 of a turret-shaped, gauge plate carrier 11 for the various gauges as generally denoted at 10, and a pin hole 8 for fixing a positioning pin 9, as shown in FIG. 4. The gauge 10 comprises the turret-shaped gauge plate carrier 11 and a number of gauge plates 15 as shown in FIGS. 4 to 6, the gauge plates 15 being mounted in slots formed radially at equi-angular intervals in respect to the axis thereof on the upper end surface of the carrier 11, whereby each of the gauge plates 15 is adapted to be fixed to the corresponding slot by means of a pair of wedges 16 and a set screw 17. The turret-shaped gauge plate carrier 11 is provided on its under surface with the central shaft 12 at its center and a plurality of radial notches 18 at the positions just below said respective slots for receiving the gauge plates 15, which notches 18 are adapted to engage with the positioning pin 9. In order to precisely set the gauge plate 15 on the gauge plate carrier 11, after the gauge 10 is placed on the tool holder 1 with its central shaft 12 inserted into the hole 7 of the tool holder 1 and simultaneously one of the notches 18 is engaged with the rigidly secured positioning pin 9, the gauge plate carrier 11 is rigidly secured to the tool holder 1 by engaging one of the faces of a circumferential V-groove 13, formed in a medial portion of the central shaft 12, with a complemental conical end portion formed on the top of the set screw 14, the latter of which is screwed into a threaded hole 7′ formed in the body of the tool holder 1 so as to reach the inner wall of its hole 7.

After the gauge plate carrier 11 is thus rigidly secured to the tool holder 1, the cutting tool 20 is precisely set to the tool holder 1 in its slot 2 by means of any known suitable means. Thereafter, a gauge plate 15 which is previously machined or notched at its under edge to provide a suitable gauge surface conforming to the particular shape of the tip of the desired cutting tool, is placed with the machined edge resting lightly on the tip of the cutting tool 20, while its inner end portion of plate 15 is inserted into one of the slots of the gauge plate carrier 11. The gauge plate 15 is then rigidly fixed in the slot by means of the pair of wedges 16 and the set screw 17, as shown in FIGS. 5 and 6.

Once the gauge plate 15 is rigidly secured to the gauge plate carrier 11, the gauge 10 is kept detached from the tool holder 1 until its use for the positioning and setting of the cutting tool is required. For a gauge adaptable for setting more than one cutting tool, the above procedure is repeated for the respective different cutting tools, so that their gauge plates 15 also are rigidly secured in spider-leg fashion within respective slots of the gauge 10. Accordingly, when it is necessary to set any desired cutting tool on the tool holder 1, it is necessary only to secure the gauge 10 on the tool holder 1 with the selected gauge plate 15 corresponding to the required cutting tool to be set in the manner as stated above, and to then set the cutting edge of the chosen cutting tool 20 on the tool holder 1 in the manner shown in engagement with the corresponding gauge surface of the gauge plate 15. With this novel device as described thus far, the positioning and setting of the cutting tool is performed with a maximum of accuracy. This is because the gauge plate 15 having a gauge surface conforming to the shape of the tip of the cutting tool is always set on the tool holder at the same position relative to the tool holder, and since the positioning is directly taken place on the tool holder by the tool, the positioning operation is exceptionally easy and the time required is substantially decreased.

When a number of cutting tools of different shapes are to be mounted on respective tool holders of a turret, the required number of the gauge plates which have been formed with gauge surfaces conforming to the respective tool shapes can be secured on the same gauge plate carrier as aforesaid, which facilitates the positioning operation of the cutting tools on respective tool holders.

Several examples of the differently shaped gauge or guide plates 15 to be secured on a gauge plate carrier 11 are shown in FIG. 7 to 11 together with the corresponding cutting tools 20 to be positioned on respective tool holders by the aid of said gauge plates.

It is to be understood that the notches 18 of the gauge plate carrier 11 do not necessarily have to lie directly beneath the corresponding gauge plates 15 to be secured on the carrier 11; and further that the gauge plate 15 may be secured on the gauge plate carrier 11 by any other suitable means, other than by use of a pair of wedges and a set screw as stated above and shown in FIGS. 5 and 6.

It will be also understood that the present invention can have application not only in positioning of cutting tools on the tool holder of the turret of an automatic lathe, as described above, but also in positioning the cutting tools on a similar tool rest such as a square turret of an automatic copying lathe.

FIG. 14 is a chart showing several examples of the permissible tolerances or setting errors when cutting tools having the different shapes as shown in the chart are positioned and set on the tool holders using this novel device. As evident from the table, none of the tolerances or errors exceed 5–6$\mu$ and consequently a positioning accuracy below 10$\mu$ is always guaranteed.

While the foregoing is described and illustrated as a preferred embodiment of the invention, it will be appreciated that other modifications may be made without departing from the spirit of our invention.

What is claimed is:

1. A gauge device for correctly orienting and/or positioning a machine cutting tool on a tool holder of a machine tool rest such as on an automatic lathe, comprising a gauge plate carrier with means for detachably mounting on said tool holder at a predetermined position, said gauge plate carrier having a turret-shaped body provided with opposed end surfaces and provided with a plurality of radial slots at equi-angular intervals on one of its end surfaces for respectively receiving a plurality of gauge plates therein; said gauge plates each secured in one of said radial slots by means of a pair of coacting wedges and a set screw, said wedges being relatively radially adjustably disposed within an enlarged portion of each of said slots and held in operative frictional engagement with said tool gauge plate, and against which gauge plate the cutter tool to be positioned is complementally engaged to effect its correct orientation with respect to said tool holder; a central shaft projecting outward from the carrier body end surface opposite to that having said radial slots, said shaft having an annular circumferential V-groove formed in a medial portion of said central shaft and adapted to be introduced into a hole provided in a predetermined location in said tool holder to effect its rigid securing to said tool holder by engaging one of the V-groove faces with a complementally shaped conical end portion of a set screw adjustably threaded in said tool holder transversely to said central shaft; a positioning pin to be secured in a predetermined gauge-plate-carrier-engaging position on said tool holder; and a plurality of notches provided radially about said central shaft in said gauge plate carrier and on its same end surface from which said central shaft protrudes, said notches corresponding in number to the number of gauge plates and selectively individually engaging with said positioning pin to correctly position a preselected gauge plate relative to said tool holder.

2. A gauge device for correctly orienting and/or positioning a machine cutting tool on a tool holder of a machine tool rest, such as on an automatic lathe, comprising a gauge plate carrier including means for detachably mounting it on said tool holder at a predetermined position; at least one gauge plate secured in a predetermined position on said gauge plate carrier against which gauge plate the cutting tool to be positioned is engaged to effect its correct orientation with respect to said tool holder; said gauge plate carrier having a body provided with opposed end surfaces, and provided with a plurality of radial slots for receiving a plurality of said gauge plates at equi-angular intervals on one of its end surfaces; each of said gauge plates being selectively secured to said carrier in a predetermined one of said radial slots by means of a coacting pair of wedges held in an adjusted position engagingly adjacent said gauge plate being secured, said wedges being relatively radially adjustable within a laterally enlarged portion of said radial slot and held in their adjusted position by means of a set screw engageable with at least one of said wedges; and a central shaft projecting axially outwardly from the gauge plate carrier's opposed other end surface and to be introduced into a hole provided in a predetermined location in said tool rest to effect the predetermined mounting position thereof on said tool holder.

\* \* \* \* \*